(12) United States Patent
Lummes et al.

(10) Patent No.: US 12,018,938 B2
(45) Date of Patent: Jun. 25, 2024

(54) SURFACE FINISH STYLUS (71) Applicant: RENISHAW PLC, Wotton-under-Edge (GB)

(72) Inventors: Stephen Edward Lummes, Stroud (GB); Mark James Andrew Holmes, Cardiff (GB)

(73) Assignee: RENISHAW PLC, Wotton-under-Edge (GB)

( * ) Notice: Subject to any disclaimer, the term of this patent is extended or adjusted under 35 U.S.C. 154(b) by 636 days.

(21) Appl. No.: 17/044,356

(22) PCT Filed: Apr. 23, 2019

(86) PCT No.: PCT/GB2019/051133
§ 371 (c)(1),
(2) Date: Oct. 1, 2020

(87) PCT Pub. No.: WO2019/207294
PCT Pub. Date: Oct. 31, 2019

(65) Prior Publication Data
US 2021/0025686 A1 Jan. 28, 2021

(30) Foreign Application Priority Data
Apr. 26, 2018 (GB) ..................... 1806830

(51) Int. Cl.
*G01B 5/28* (2006.01)
*G01B 1/00* (2006.01)
(Continued)

(52) U.S. Cl.
CPC .............. *G01B 5/28* (2013.01); *G01B 1/00* (2013.01); *G01B 5/012* (2013.01); *G01B 7/012* (2013.01); *G01B 7/34* (2013.01)

(58) Field of Classification Search
CPC . G01B 5/28; G01B 1/00; G01B 7/012; G01B 5/012; G01B 7/34
See application file for complete search history.

(56) References Cited

U.S. PATENT DOCUMENTS 4,340,860 A * 7/1982 Teeple, Jr. ......... G01R 1/07314
324/750.16
4,364,178 A * 12/1982 Huet ..................... G01B 7/012
33/503
(Continued)

FOREIGN PATENT DOCUMENTS

| CH | 557998 A | 1/1975 |
| CN | 1975319 A | 6/2007 |

(Continued)

OTHER PUBLICATIONS

DE-19809589-A1: Arndt et al. "Calibrating Scanner Of Electronically-controlled Co-ordinate Measuring Device", Sep. 1999. (Year: 1999).*
(Continued)

*Primary Examiner* — John Fitzgerald
*Assistant Examiner* — Tania Courson
(74) *Attorney, Agent, or Firm* — Oliff PLC (57) ABSTRACT

A surface finish stylus is described that includes an elongate stylus shaft and a contact element protruding from the elongate shaft for contacting a surface to be measured. The contact element is deformable and the stylus shaft includes a clamp for retaining the contact element, the contact element being deformed by the clamp. The contact element may comprise a metal, such as chromium steel or nitinol. The contact element includes one or more regions of weakness to cause a required deformation when retained by the clamp. The surface finish stylus may be used with a surface finish measurement probe or the like.

14 Claims, 8 Drawing Sheets

(51) Int. Cl.
*G01B 5/012* (2006.01)
*G01B 7/012* (2006.01)
*G01B 7/34* (2006.01)

(56) References Cited

U.S. PATENT DOCUMENTS

| | | | | |
|---|---|---|---|---|
| 4,934,065 | A * | 6/1990 | Hajdukiewicz | G01B 7/012 33/561 |
| 4,941,266 | A | 7/1990 | Bissegger et al. | |
| 5,084,673 | A * | 1/1992 | Kazama | G01R 1/06722 324/755.05 |
| 5,222,304 | A | 6/1993 | Butler | |
| 5,315,259 | A * | 5/1994 | Jostlein | G01B 7/012 324/662 |
| 5,778,551 | A * | 7/1998 | Herklotz | G01B 7/34 33/503 |
| 6,874,243 | B2 * | 4/2005 | Hama | G01B 5/28 33/551 |
| 7,055,367 | B2 * | 6/2006 | Hajdukiewicz | G01B 21/042 702/155 |
| 7,472,491 | B2 | 1/2009 | Fischer | |
| 7,493,803 | B2 * | 2/2009 | Kelleher | G01N 3/42 73/84 |
| 7,594,339 | B2 * | 9/2009 | Seitz | G01B 5/012 33/503 |
| 7,847,955 | B2 * | 12/2010 | McFarland | G01B 5/012 356/614 |
| 8,006,399 | B2 * | 8/2011 | Wallace | G01B 5/012 33/503 |
| 9,074,865 | B2 * | 7/2015 | Yamauchi | G01B 21/30 |
| 9,291,442 | B2 * | 3/2016 | Hidaka | G01B 21/30 |
| 9,726,481 | B2 * | 8/2017 | McMurtry | G01B 7/008 |
| 9,874,439 | B2 * | 1/2018 | Bucher | G01B 11/303 |
| 11,326,869 | B2 * | 5/2022 | Lummes | G01B 7/34 |
| 2003/0084584 | A1 * | 5/2003 | Osterstock | G01B 5/016 33/559 |
| 2005/0076709 | A1 * | 4/2005 | Mackenzie | G01N 3/42 73/862.636 |
| 2007/0125946 | A1 * | 6/2007 | Boye | B82Y 35/00 250/309 |
| 2011/0030520 | A1 | 2/2011 | Joncour | |
| 2014/0211828 | A1 * | 7/2014 | Moersch | G01K 1/20 374/142 |
| 2015/0101205 | A1 * | 4/2015 | Jensen | G01B 5/012 33/503 |
| 2016/0097626 | A1 | 4/2016 | Miess et al. | |
| 2016/0195382 | A1 * | 7/2016 | McMurtry | G01B 5/012 33/503 |
| 2016/0231108 | A1 | 8/2016 | Bucher et al. | |
| 2017/0227346 | A1 * | 8/2017 | Yamauchi | G01B 5/28 |
| 2017/0284971 | A1 | 10/2017 | Hall | |
| 2022/0063041 | A1 * | 3/2022 | Marshall | B23Q 17/09 |

FOREIGN PATENT DOCUMENTS

| | | |
|---|---|---|
| CN | 204094000 U | 1/2015 |
| CN | 106825181 A | 6/2017 |
| DE | 3417014 A1 | 11/1985 |
| EP | 2 722 643 A1 | 4/2014 |
| EP | 3 279 644 A1 | 2/2018 |
| GB | 2006435 A | 5/1979 |
| GB | 2218227 A | 11/1989 |
| WO | 90/00717 A1 | 1/1990 |

OTHER PUBLICATIONS

DE-3417014-C2; Aehnelt, "Feeler Holder", 1987. (Year: 1987).*
Jul. 29, 2019 International Search Report issued in International Patent Application No. PCT/GB2019/051133.
Jul. 29, 2019 Written Opinion issued in International Patent Application No. PCT/GB2019/051133.
Oct. 15, 2018 British Search Report issued in British Patent Application No. 1806830.4.

* cited by examiner

SURFACE FINISH STYLUS

BACKGROUND

The present invention relates to surface finish styli and in particular to surface finish styli having a deformable contact element clamped to an elongate stylus shaft.

It is commonplace to measure workpieces after they are machined to ensure they meet certain required criteria. In particular, it is known to measure the form and/or surface finish of workpieces that have been machined by a machine tool. Although the form of machined parts is routinely measured "on-machine" using a scanning probe carried in the spindle of the machine tool that was used to cut the workpiece, the surface finish (e.g. surface roughness) of such parts is typically measured "off-machine" using a dedicated profilometer.

A typical profilometer includes an elongate shaft having a stiff tip for contacting a workpiece that extends perpendicularly from the distal end of the shaft. The tip is placed in contact with the surface to be measured and then pushed or pulled along that surface thereby following any fine features (e.g. valleys and peaks) of the surface. A sensor monitors vertical deflection of the tip as it is moved across the horizontal surface thereby providing a measure of surface roughness. It is known to provide a plurality of different tips, for example diamond-tipped metal rods or ceramic disks, that can be attached to the shaft for different surface finish measuring tasks.

US2016/0231108 describes an apparatus for measuring surface finish on a machine tool using a multi-directional scanning probe of the type traditionally used to acquire form measurements. In particular, a surface finish stylus is provided that comprises an elongate shaft carrying a rotationally symmetrical ceramic disk that protrudes orthogonally from the shaft. The region of largest diameter of the disk acts as a contact sensing surface that is held perpendicularly to the surface being measured. The apparatus of US2016/0231108 can thus be used for "on-machine" surface finish measurements (e.g. measurements of the internal surfaces of a bore).

SUMMARY

The present inventors have found that the use of a machine tool scanning probe of the type used to also acquire form measurements has a number of disadvantages. For example, the high spring forces that are typically provided to return the stylus to its neutral position can lead to a high contact force being applied by the stylus to the surface of the object being measured. This can cause damage (e.g. it can mark or scratch) the surface being measured.

According to a first aspect of the present invention, there is provided a surface finish stylus, comprising;
an elongate stylus shaft, and
a contact element protruding from the elongate shaft for contacting a surface to be measured,
characterised in that the contact element is deformable and the stylus shaft comprises a clamp for retaining the contact element, the contact element being deformed by the clamp.

The present invention thus provides a surface finish stylus that comprises an elongate stylus shaft and a contact element protruding from the elongate shaft for contacting a surface to be measured. The surface finish stylus may be used with a scanning probe or profilometer to measure surface finish (e.g. surface roughness or surface waviness), but is particularly suited for use with a machine tools scanning probe. The surface finish stylus of the present invention is characterised by comprising a contact element that is deformable and the stylus shaft comprises a clamp for retaining the contact element. The contact element is deformed by the clamp when clamped thereby, for example to provide the desired shape of contact element or to provide a feature that ensures the contact element is securely fixed to the stylus shaft. This arrangement allows a contact element of a desired shape to be formed in-situ by the clamp and also allows the contact element to be removed and replaced as necessary. As explained below, the deformable material may also reduce the damage to surfaces if the stylus is used with a machine tool measurement probe that applies a relatively high return-force to the stylus.

The contact element may be dimensioned to measure any desired aspect of surface finish. It should be noted that the term surface finish as used herein refers to finer details of the surface than the form of the surface measured using a standard machine tool scanning probe stylus. The contact element may be configured to measure surface waviness. The contact element may be configured to measure surface roughness. Surface waviness and surface roughness are examples of surface finish.

The contact element is preferably dimensioned to measure the required aspect of surface finish. For example, the distal end (or tip) of the contact element may have an effective radius of less than 2 mm. The effective radius is the thickness of the part of the contact element that touches the surface in the dimension parallel to the direction along which it moved over the surface. A smaller effective radius can thus follow finer features (e.g. move up and down the side walls of valleys or grooves in the surface) as it is moved along the surface. Conveniently, the contact element may have an effective radius of less than 1 mm. Conveniently, the contact element may have an effective radius of less than 0.5 mm. Conveniently, the contact element may have an effective radius of less than 300 µm. Advantageously, the contact element may have an effective radius of less than 200 µm. Advantageously, the contact element has an effective radius of less than 100 µm. Advantageously, the contact element has an effective radius of less than 50 µm. The smaller the object-contacting end or tip of the contact element, the finer the resolution of surface texture that can be measured (but the more susceptible the contact element is to wear or damage during use). For surface roughness, the measured variation in surface texture may be used to generate an "Ra" surface roughness value.

Advantageously, the contact element comprises a thin sheet of material. For example, the contact element may comprise a sheet of material having a thickness less than 1 mm. Advantageously, the sheet of material has a thickness less than 0.5 mm. Preferably, the sheet of material has a thickness less than 0.25 mm. Preferably, the sheet of material has a thickness or around 0.1 mm. The sheet of material may have a tapered edge. The region (edge) for contacting the surface of an object can thus be thinner than the bulk of the thin sheet to provide an effective radius of the dimension described above.

The one or more contact elements may be formed from any suitable material. For example, a ceramic or glass material may be used. Alternatively, the one or more contact elements may be formed from a metal.

The material forming the one or more contact elements preferably has a low stiffness (to minimise damage to the surface being measured). Advantageously, the Young's modulus (E) of the one or more contact elements is less than 250 GPa. More preferably, the Young's modulus of the one or more contact elements is less than 150 GPa. More preferably, the Young's modulus of the one or more contact elements is less than 100 GPa. More preferably, the Young's modulus of the one or more contact elements is less than 50 GPa.

Advantageously, the material is also mechanically hard (i.e. to reduce wear). The material forming the one or more contact elements thus preferably has a high hardness. Advantageously, the hardness (H) of the one or more contact elements is greater than 1 GPa. Conveniently, the hardness (H) of the one or more contact elements is greater than 2 GPa. Preferably, the hardness (H) of the one or more contact elements is greater than 5 GPa.

The Young's modulus (E) and hardness (H) properties of the one or more contact elements are each important in their own right, but it is also possible to use the ratio of stiffness to hardness (the "E/H" ratio) when selecting a suitable material for the contact elements. In particular, it is preferred that the E/H ratio is as low as possible. For example, the E/H ratio is preferably less than 50. More preferably, the E/H ratio is less than 20. More preferably, the E/H ratio is 15 or less. More preferably, the E/H ratio is less than 10.

The one or more contact elements may comprise any suitable material (e.g. having the properties outlined above. The contact element may be formed from multiple materials. Advantageously, the contact element comprises a single material. Conveniently, the contact element(s) comprise metal; for example, a metallic disk or metallic sheet of material may form the contact element. The contact element may comprise steel. For example, the contact element may comprise a chromium steel such as the martensitic chromium steel "Chromflex" as produced by Sandvik AB, Stockholm, Sweden. Chromflex has a Young's modulus (E) of 210 GPa and hardness (H) of 5.8 GPa (so E/H=36). Alternatively, the contact element may comprise zirconia (E=200 GPa, H=11.8 GPa and E/H=17). Alternatively, the contact element may comprise steatite (E=120 GPa, H=5.8 GPa and E/H=21). Alternatively, the contact element may comprise N-BK7 borosilicate glass (E=82 GPa, H=5.6 GPa and E/H=15). Advantageously, the contact element may comprise nitinol (E=45 GPa, H=5.5 GPa and E/H=8).

The contact element may initially be formed as a substantially planar or flat element that is deformed by the clamp (i.e. when clamping forces are applied). The imparted deformation may be controlled by appropriately weakening parts of the contact element prior to clamping so that a desired shape of contact element is obtained after it has been clamped to the stylus. For example, the contact element may comprise one or more regions of weakness (e.g. thinner regions) to cause a required deformation when retained by the clamp.

The deformation of the contact element that is provided by the clamp may be used for a variety of purposes. Advantageously, the clamp deforms a portion of the contact element to immovably secure the contact element to the clamp. For example, an inner portion or segment of the contact element may be deformed by the clamp to form a protruding lip or rim. This lip may then prevent lateral motion of the contact element within the clamp thereby reducing the clamping force required to ensure the contact element remains in place during use.

The contact element may be any suitable shape. Preferably, the contact element is round or ovoid shaped. Advantageously, the contact element comprises a disk. The contact element may include a plurality of different regions for contacting a surface. For example, the contact element may comprise a plurality of slits formed therein that enable a plurality of regions that protrude from a plane of the contact element.

In a preferred embodiment, the clamp deforms the disk to form a hollow cone having a peripheral edge for contacting a surface. The peripheral edge of the hollow cone may protrude from the elongate stylus shaft at an oblique angle to the longitudinal axis. Advantageously, the oblique angle is approximately 45°. The peripheral edge may thus form a base of the cone and the apex of the cone may be coincident with the longitudinal axis of the stylus shaft. The peripheral edge is preferably arranged to contact the surface to be measured; for example, the peripheral edge of the hollow cone may be rounded and have a suitable effective radius for the surface finish measurement. The hollow cone may comprise a complete hollow cone (i.e. with a peripheral edge around the full 360° of the stylus circumference) or a partial hollow cone (i.e. with a peripheral edge around only part of the stylus shaft circumference). In use, the peripherical edge is brought into contact with the surface of an object with the stylus suitably orientated so that the direction along which the hollow cone extends from the stylus shaft is locally aligned with the surface normal. The stylus can then be translated to move the hollow cone along the surface whilst maintaining local alignment with the surface normal. Surface finish information can be determined from motion of the hollow cone in the direction perpendicular to the surface.

As mentioned above, the peripheral edge of the cone may thus protrude from the stylus shaft at an oblique angle of 45°. In this example, orientating the stylus at 45° to the vertical can be used to measure the surface roughness of both a horizontal and a vertical surface; i.e. diametrically opposed portions of the peripheral edge can be aligned to the surface normal directions of both vertical and horizontal surfaces. The stylus can then be moved (pushed or pulled) along vertical and horizontal surfaces of an object by translational motion alone (i.e. there is no need to re-orientate the object relative to the stylus).

The clamp may be formed in any suitable manner. The clamp may include a pair of clamping elements or jaws and an actuator (e.g. a bolt or screw) that can be tightened to drive the clamping elements towards one another. A contact element located between the pair of clamping element can then be retained by the clamp. The clamp may include a pair of opposed clamping faces shaped to deform the contact element into the desired shape. For example, complementary cone shaped elements may be used to deform a flat disk into a hollow cone.

The clamp may be arranged to permanently retain a contact element retained thereby. Advantageously, the clamp allows a contact element to be releasably attached to shaft. In this manner, a worn or damaged contact element can be replaced without having to replace the rest of the stylus. This can allow the contact elements to be easily replaced and hence allows them to be formed from a less resilient material.

The stylus may just include a single contact element and a single clamp. Advantageously, an additional clamp may be provided for clamping an additional contact element. In this manner, the stylus may comprise a plurality of contact elements and plurality of clamps for retaining each of the plurality of contact elements. The plurality of contact elements may have a plurality of different orientations relative to the stylus shaft. For example, contact elements may protrude from the shaft in different directions and/or be aligned at different angles to the shaft. In a preferred embodiment, one contact element may protrude from the distal end of the stylus shaft along the longitudinal axis and other contact elements may protrude from the side of the shaft. The surface finish of surfaces at different orientations relative to the stylus shaft may then be measured using different contact elements. For example, if the stylus was held vertically a horizontal surface may be measured using a contact element protruding from the distal end of the stylus shaft whilst vertical surfaces may be measured using the other contact elements.

The stylus is preferably non-skidded (i.e. it preferably does not comprise a skid and only the contact element engages the surface being measured). The stylus shaft is preferably directly attachable to the stylus holder of a scanning probe. The stylus shaft is also preferably rigid. Advantageously, the stylus shaft does not include any rotary (knuckle) joints or the like for altering the orientation of the contact element relative to the stylus holder of the scanning probe to which it is attached. In this manner, the location and orientation of the contact element is invariable relative to the stylus holder of the scanning probe to which it is attached.

The present invention also extends to a scanning probe that includes the above described surface finish stylus. Advantageously, the scanning probe is a machine tool scanning probe (i.e. a scanning probe suitable for use in a machine tool environment). The scanning probe may then be used for acquiring surface finish measurements. The scanning probe may be a multi-directional scanning probe. A multi-directional scanning probe can measure the deflection of an attached stylus in multiple directions rather than the single direction of deflection that can be sensed by the unidirectional measurement sensor of a prior art profilometer. The scanning probe preferably comprises a probe body and a stylus holder moveably attached to the probe body. The stylus may be deflectable relative to the housing of the scanning probe in any one of two mutually perpendicular directions or in any of three mutually perpendicular directions. At least one deflection sensor may be provided for measuring deflection of the stylus holder relative to the probe body. A surface finish stylus as described above is attached to the stylus holder (e.g. via a standard screw-thread attachment).

The machine tool scanning probe preferably comprises at least one deflection sensor for measuring stylus deflection. The measured stylus deflection is termed herein probe data and can be output by the scanning probe (e.g. over a wired or wireless link). The scanning probe may include a deflection sensor that can only measure the magnitude (not direction) of stylus deflection; i.e. the scanning probe may comprise a multidirectional, single output scanning probe that generates probe data describing only the magnitude of stylus deflection. For example, the scanning probe may comprise a TC76-Digilog or a TC64-Digilog scanning probe as manufactured by Blum Novotest GmbH, Germany or a model G25 probe sold by Marposs, Italy. Alternatively, the scanning probe may comprise sensors that can measure both the magnitude and direction of any stylus deflection. For example, the analogue scanning probe may generate three output signals that relate to the deflection of the stylus tip in three mutually orthogonal directions. The SPRINT (OSP-60) probing system manufactured by Renishaw plc, Wotton-Under-Edge, UK is an example of such a scanning probe.

According to a second aspect of the present invention, there is provided a method for forming a surface finish stylus that comprises an elongate stylus shaft and a contact element protruding from the elongate shaft for contacting a surface to be measured, the method being characterised by a step of clamping the contact element to the elongate shaft, the clamping step deforming the contact element. In this manner, the contact element (when deformed) can be used in a method of surface finish measurement Also described herein is a surface finish stylus, comprising; an elongate stylus shaft, and a contact element protruding from the elongate shaft for contacting a surface to be measured, wherein the contact element comprises a metallic sheet having a thickness less than 1 mm. The stylus may include any one or more of the other features also described herein.

Also described herein is a surface finish stylus, comprising; an elongate stylus shaft, and a contact element protruding from the elongate shaft for contacting a surface to be measured, wherein the contact element is formed from a material having a Young's Modulus less than 150 GPa. The stylus may include any one or more of the other features also described herein.

Also described herein is a surface finish stylus, comprising; an elongate stylus shaft, and a contact element protruding from the elongate shaft for contacting a surface to be measured, wherein the contact element comprises a deformed disk. The stylus may include any one or more of the other features also described herein.

Also described herein is a stylus (e.g. a surface finish stylus) comprising an elongate stylus shaft and a contact element for contacting a surface to be measured, wherein the contact element comprises nitinol. The stylus may include any one or more of the other features also described herein.

Also described herein is a surface finish stylus comprising a plurality of clamps and a plurality of contact elements retained by the plurality of clamps. The stylus may include any one or more of the other features also described herein.

The skilled person would appreciate that any of the above described features may be combined with any one or more features of the specific embodiments that are described below. Similarly, features described in the context of a method may form part of the apparatus and vice versa.

BRIEF DESCRIPTION OF THE DRAWINGS

The invention will now be described, by way of example only, with reference to the accompanying drawings in which;

FIG. 12 illustrates a surface roughness machine tool scanning probe using the stylus of FIG. 5a.

DETAILED DESCRIPTION OF EMBODIMENTS

Figure 1:
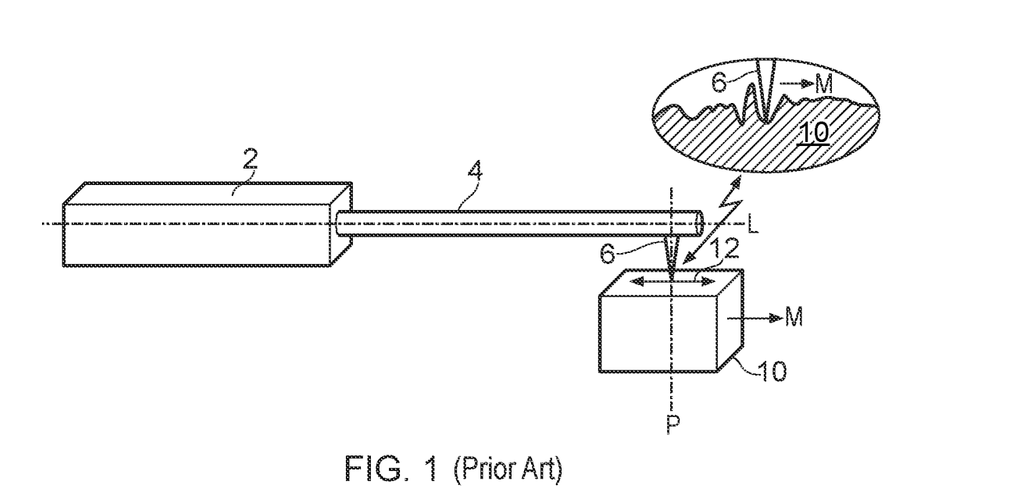
FIG. 1 illustrates a prior art profilometer apparatus.

Referring to FIG. 1, a prior art profilometer is schematically illustrated. The profilometer comprises a housing 2 from which extends an elongate shaft 4 having a longitudinal axis L. A contact element 6 extends perpendicularly from the shaft 4 along the direction P. The housing 2 includes a unidirectional transducer (not shown) that measures any deflection of the shaft 4 caused by motion of the contact element 6 back and forth along the direction P.

In use, the contact element 6 is brought into contact with the surface of an object 10 and lightly biased towards the surface. The object 10 is then moved in a direction M that is parallel to the longitudinal axis L. This relative motion between the object 10 and profilometer may be imparted by moving the object 10, the profilometer or both the object and the profilometer. The result of the relative motion is to cause the contact element 6 to move (i.e. to be pushed or pulled) along a path 12 on the surface of the object 10. The contact element 6 also moves up and down to follow the surface; this can be seen in the inset to FIG. 1 that provides an expanded view of the tip of the contact element 6 and the object's surface. The unidirectional transducer within the housing 2 outputs a deflection signal that is related to the vertical deflection of the contact element 6 (i.e. deflection along the direction P). Analysis of the variations in the deflection signal as the path 12 is traversed provides a measure of surface finish of that region of the object. For example, an average surface roughness or $R_a$ value may be calculated.

Figure 2:
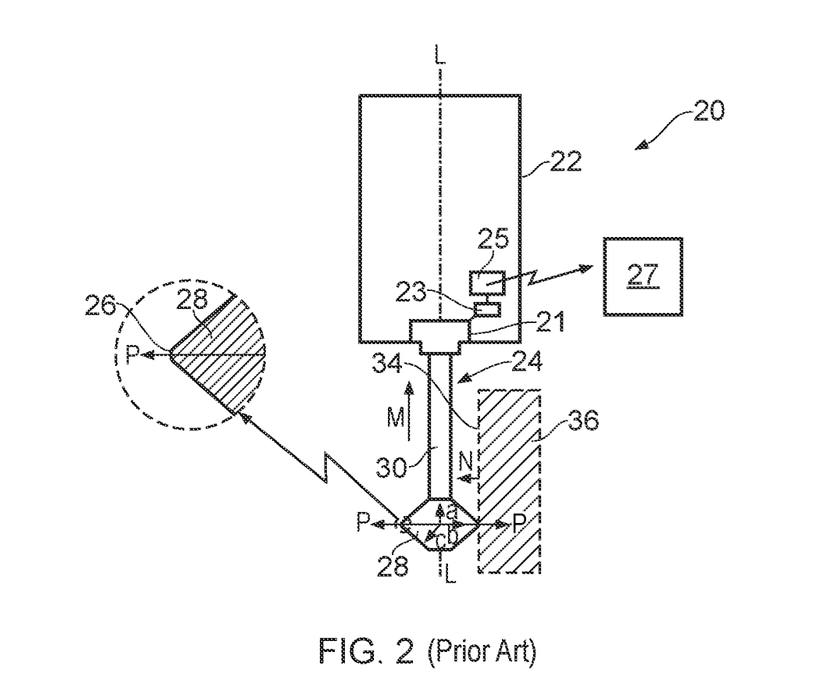
FIG. 2 illustrates a prior art surface roughness machine tool scanning probe.

Referring to FIG. 2, the prior art surface roughness probe 20 of US2016/0231108 will be described in more detail. As mentioned above, the scanning probe of US2016/0231108 is a multi-directional scanning probe that can be mounted to the spindle of a machine tool to allow "on-machine" measurement of workpieces.

The scanning probe 20 comprises a probe body 22 and a stylus holder 21 for retaining a stylus. The stylus holder 21 is attached to the probe body 22 by a deflection mechanism (not shown) and a transducer 23 is also provided within the probe body 22 for measuring the magnitude of deflection of the stylus holder 21 (i.e. caused by deflection of an attached stylus) relative to the probe body 22. Deflection measurements taken by the transducer 23 are passed by a transmitter unit 25 to a probe interface 27. The probe body 22 is also attachable to the spindle of a machine tool via a tool shank (not shown). The probe 20 can thus be moved around the working volume of the machine tool and in particular the probe stylus can be brought into contact with the surface of an object to be measured.

A scanning probe 20 of this type is traditionally used with a stylus that enables the form of an object to be measured; e.g. such a stylus may comprise a ruby sphere of several millimetres diameter that is attached to the distal end of an elongate shaft. The amount of force required to ensure stylus engagement with the surface is relatively high. In the various examples described in US2016/0231108, a surface roughness stylus 24 is instead attached to the probe 20. The surface roughness stylus 24 comprises an elongate shaft 30 and a contact element 28 that extends perpendicularly P from the longitudinal axis L of the shaft 30. The contact element 28 has the form of a double-truncated cone with a rounded peripheral edge 26 (shown in the inset to FIG. 2) around its circumference.

In use, the perpendicular direction P along which the contact element 28 protrudes from the shaft 30 is aligned to be parallel with the surface normal N of a surface to be measured. FIG. 2 shows a suitable vertical surface 34 of an object 36 in dashed outline. The peripheral edge 26 of the contact element 28 is brought into contact with the vertical surface 34 and the probe 20 is then moved vertically upwards in the direction M. To maintain the required alignment of the perpendicular protrusion direction P of the contact element 28 with the surface normal N, the probe 20 is moved vertically along a direction M that is both parallel to longitudinal axis L of the stylus shaft 30 and also parallel to the plane of the surface 34. The transducer 23 of the scanning probe 20 measures the magnitude of stylus deflection as it is dragged along the surface 34 and these measured deflection values are used to ascertain surface roughness.

The present inventors have recognised a number of drawbacks associated with known surface finish measurement apparatus of the type described above. In particular, the majority of surface finish styli typically used with profilometers generate too much contact pressure if used with a machine tool scanning probe. This can lead to scratching of the surface. Although the use of the stylus disk geometry described in US2016/0231108 reduces the contact pressure due to the increased effective radius of curvature and elliptical contact dimensions, it still remains high when used with the described measurement probe. This can lead to surface damage of the art being measured and could affect the measurement accuracy. As will be explained below, in one aspect the present invention provides a deformable contact element clamped to a stylus shaft. This allows the contact element to be replaced. Also, deformation of the contact element can ensure it is securely affixed to the stylus shaft and/or that it adopts a required shape.

Figures 3A, 3B:
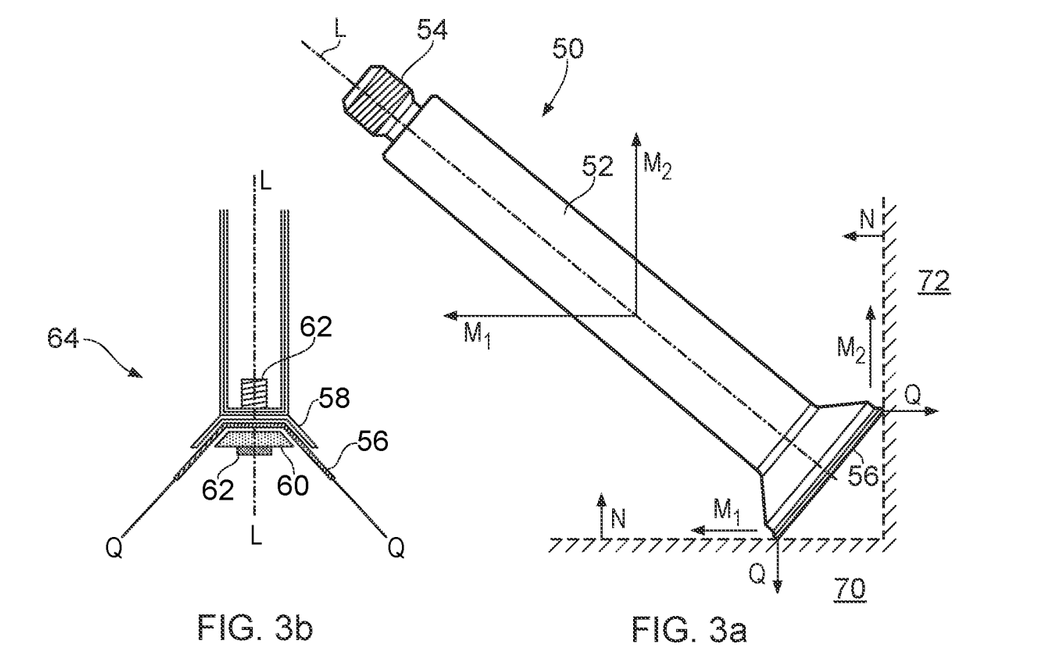
FIGS. 3a and 3b illustrates a surface finish stylus of the present invention.

FIGS. 3a and 3b illustrate a surface finish stylus 50 of the present invention. The stylus 50 comprises an elongate stylus shaft 52 having a longitudinal axis L. The proximal end of the stylus shaft 52 includes a screw-thread attachment member 54 that enables the stylus to be attached to the stylus holder of a multi-directional scanning probe (not shown). The distal end of the stylus shaft 52 comprises a contact element in the form of a hollow, conically shaped metallic disk 56. The metallic disk 56 is held in a truncated conical recess 58 by a wedge-shaped retaining member 60 that is attached to the stylus shaft by a bolt 62. The recess 58, retaining member 60 and bolt 62 thus form a clamp 64 for retaining the stylus disk. The metallic disk 56, after being deformed by clamping, provides a skirt-like contact element that extends around the circumference of the stylus shaft 52 and protrudes along a direction Q that is angled at 45° relative to the longitudinal axis L.

In use, the surface finish stylus 50 can be used to measure the surface finish of multiple surfaces having different orientations without having to re-orientate the scanning probe. For example, as shown in FIG. 3a, the surface finish stylus 50 is inclined at an angle of 45° to the horizontal (and vertical). The surface finish stylus 50 may then be moved in the direction M1 in order to measure the surface finish of a horizontal surface 70; i.e. the contact element 56 is pulled along the horizontal surface 70 by horizonal motion M1 whilst the scanning probe retaining the stylus 50 measures stylus deflection. The surface finish stylus 50 may then be moved in the direction M2 in order to measure the surface finish of a vertical surface 72; i.e. a diametrically opposed part of the contact element 56 is pulled along the vertical surface 72 by vertical motion M2 whilst the scanning probe retaining the stylus 50 again measures stylus deflection. For both the horizontal and vertical measurements, the protruding contact element 56 maintains a perpendicular orientation to the surface normal N (i.e. the direction Q along which the contact element protrudes from the elongate shaft is kept aligned to the local surface normal N as the stylus is moved along directions M1 and M2).

Figure 4A:
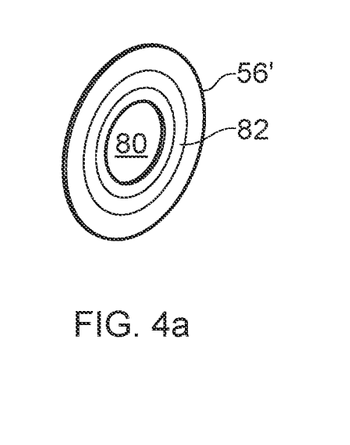
FIGS. 4a and 4b show in more detail the conical insert disk of the stylus described with reference to FIG. 3.
Figure 4B:
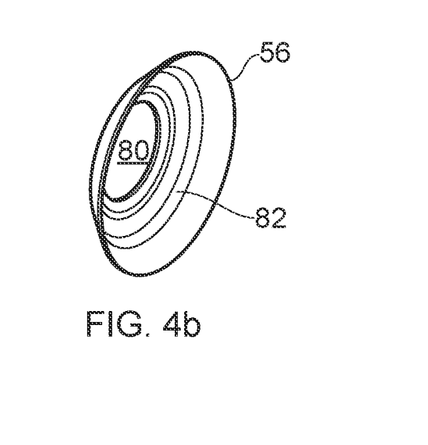

Referring to FIGS. 4a and 4b, a technique for making the surface finish stylus 50 described with reference to FIGS. 3a and 3b will be described. In particular, the method for forming the metallic disk 56 that provides the contact element of the stylus using a clamping action will be described.

As shown in FIG. 4a, a flat metallic disk 56' is provided. The disk 56' includes a central aperture 80 and an annular region 82 (i.e., a region of weakness) of material that is thinner than the rest of the disk. Referring also now to FIG. 3b, the wedge-shaped retaining member 60 is located on the bolt 62 to engage the flat metallic disk 56' already placed over the threaded bolt; the diameter of the central aperture 80 being slightly larger than the diameter of the bolt thread to provide clearance. The bolt 62 is then screwed into the stylus shaft thereby forcing the flat metallic disk 56' into engagement with the truncated conical recess 58. The flat metallic disk 56' is thus sandwiched and clamped between opposed clamping faces of the wedge-shaped retaining member 60 and the truncated conical recess 58 and tightening the bolt 62 acts to deform the flat metallic disk 56' to provide the conically shaped metallic disk 56 shown in FIG. 4b and in FIG. 3b. This ensures the metallic disk 56 is securely attached to the stylus shaft and also enables the metallic disk 56 to be easily replaced (e.g. if it becomes worn or damaged) without having to replace the entire surface finish stylus.

Figure 5A:
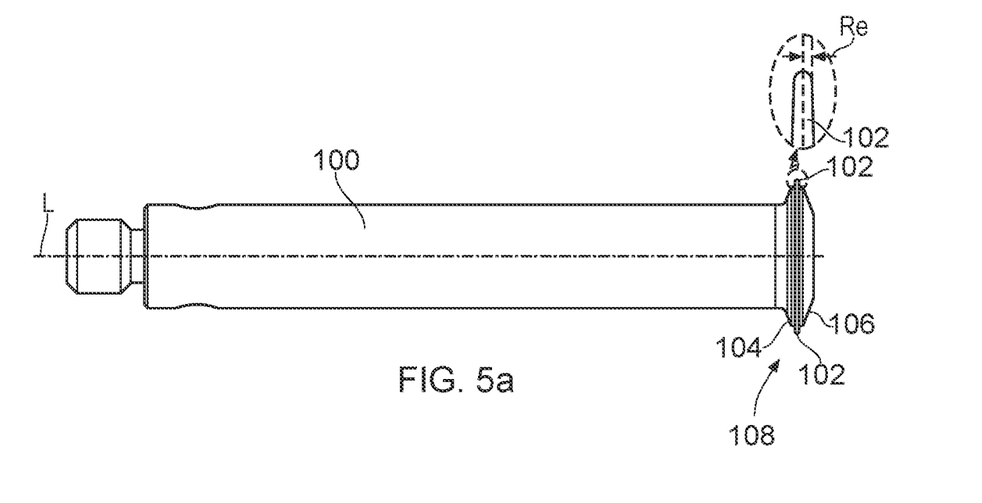
FIG. 5a illustrates a further surface finish stylus of the present invention and FIG. 5b is a photograph of such a surface finish stylus.
Figure 5B:
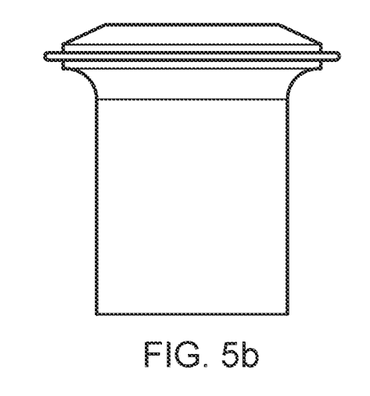
Figure 12:
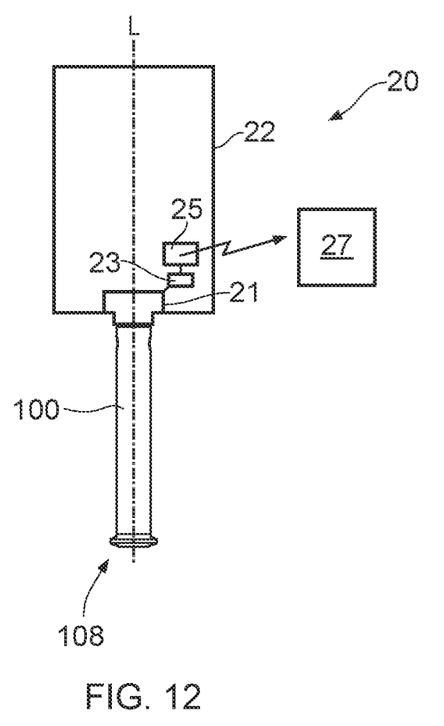

FIG. 5a shows an alternative embodiment of surface finish stylus. An elongate stylus shaft 100 having a longitudinal axis L retains a metallic disk 102 (i.e. a contact element) at its distal end. The metallic disk 102 is clamped between opposed clamping faces of a first member 104 provided at the distal end of the stylus shaft 100 and a second member 106 attached to the stylus shaft by a bolt (not shown). The first member 104 and the second member 106 thus form a clamp 108. The metallic disk 102 has a circumferential edge that extends beyond the first and second members and is arranged to contact a surface to be measured. The edge has an effective radius $R_e$, as shown in the inset to FIG. 5a. FIG. 5b is a photograph of a surface finish stylus made to the design of FIG. 5a. The thickness of the metallic disk 102 in the stylus of FIG. 5b is 100 μm with a peripheral edge having an effective radius $R_e$ of 25 μm. As illustrated by FIG. 12, the scanning probe 20 comprises the probe body 22, the stylus holder 21 moveably attached to the probe body 22, and the transducer 23 with the surface finish stylus of FIG. 5a attached to the stylus holder 21.

Figure 6A:
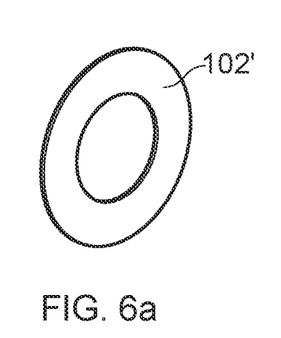
FIGS. 6a and 6b illustrate the disk of the surface finish stylus of FIGS. 5a and 5b.
Figures 6B, 7:
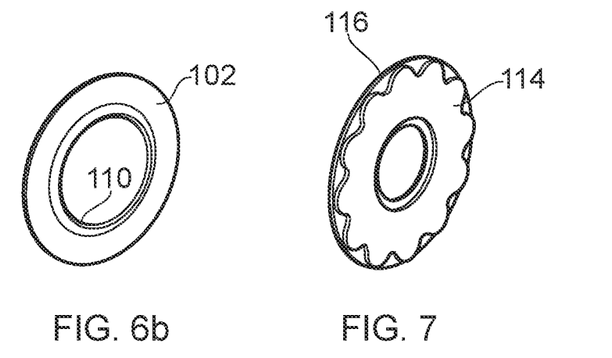
FIG. 7 shows an alternative disk.

Referring to FIGS. 6a and 6b, the metallic disk 102 of the above described surface finish stylus is illustrated. FIG. 6a shows the disk 102' in its non-deformed state prior to being clamped between the first and second members 104 and 106. The first and second members 104 and 106 are arranged to deform (bend) an inner annular portion of the disk 102 to form the lip 110 shown in FIG. 6b by the clamping action that occurs when the bolt is tightened. The lip 110 acts to ensure the disk 102 is held firmly in place by the first and second members 104 and 106; i.e. lateral motion of the disk 102 is prevented during surface finish measurements.

Although a flat metallic disk of uniform thickness of the type shown in FIGS. 6a and 6b could be used, it is also possible to provide a disk 114 having an outer edge region 116 formed from a thinner material than the rest of the disk 114 as shown in FIG. 7.

Figure 8:
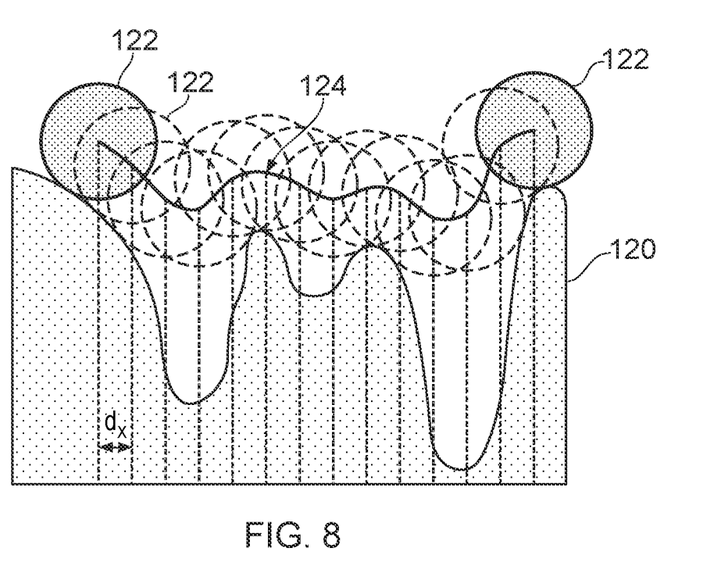
FIG. 8 illustrates the effect of effective stylus radius on surface finish measurements.
Figure 9:
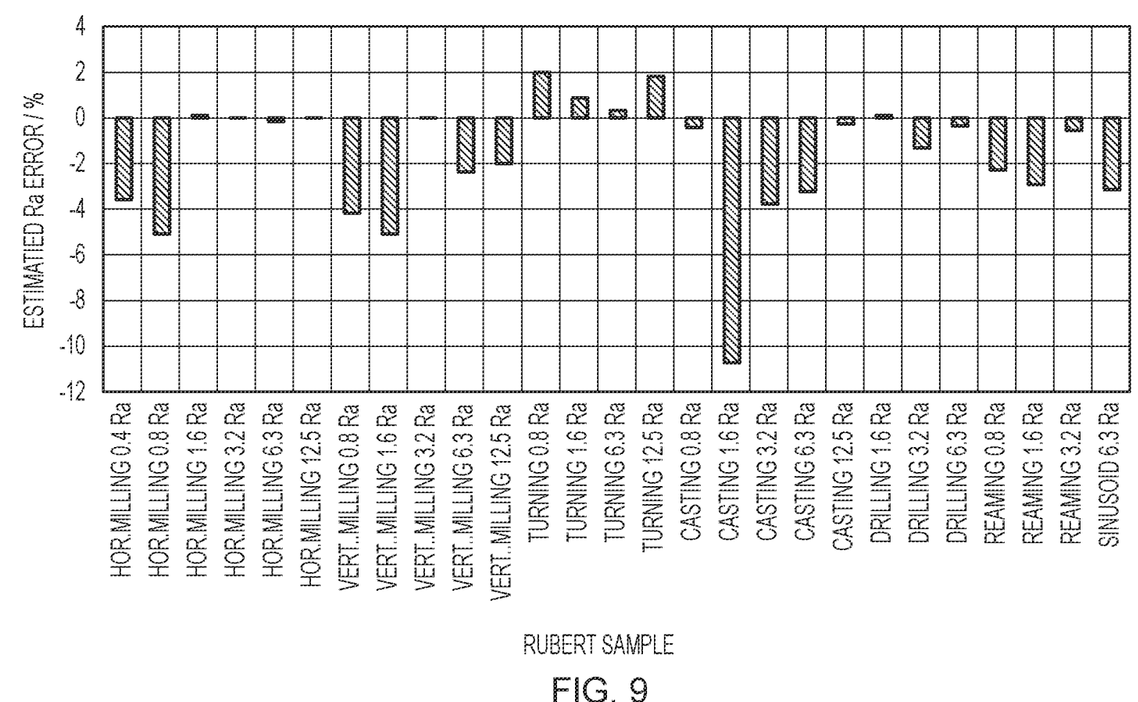
FIG. 9 shows the error in surface roughness measurement of various samples measured using the stylus of FIG. 5b.

Referring to FIGS. 8 and 9, it will be described how a theoretical model has been used to predict how accurately the contact element (i.e. the disk having an edge with an effective radius of 25 μm, which is also referred to below as an R25 μm disk) of the of the surface finish probe illustrated in FIG. 5b can measure the surface roughness (Ra) of a variety of surfaces.

FIG. 8 shows how a surface profile 120 can be modelled in two-dimensions. The stylus ball radius (i.e. the radius of the circles 122) is set to 25 μm. The stylus ball is then discretised by splitting it into an evenly spaced vertical mesh with spacing equal to the roughness spacing dx. The stylus ball geometry is calculated at each mesh point using the equation of a circle. Initially, an approach distance or separation S is adjusted so that a single mesh point on the stylus ball is in contact with a mesh point on the surface profile. A boundary condition is applied to the first separation point $S_0$ and the value is set to a similar height to the reference profile.

At time step $t_1$, the ball position is moved one sample spacing dx, the separation S is adjusted so that a single mesh point is in contact with the surface profile and the separation and contact point location is stored. This process is repeated for all positions to time step $t_N$. The new surface profile 124 can be calculated as shown in Equation 1.

$$P = \Sigma_{i+1}^{n} S_{i-1} - S_i \qquad (1)$$

FIG. 9 shows the error in Ra value predicted using the above model that results from measuring a variety of Rubert samples of known Ra (the Ra of the samples having been measured previously using a calibrated profilometer) using the contact element (i.e. the R25 μm disk) of the of the surface finish probe illustrated in FIG. 5b. It can be seen that the majority of surfaces can be measured with an accuracy of better than 5% and that even a casting with narrow vertical valley features can be measured to within 10%.

Figure 10:
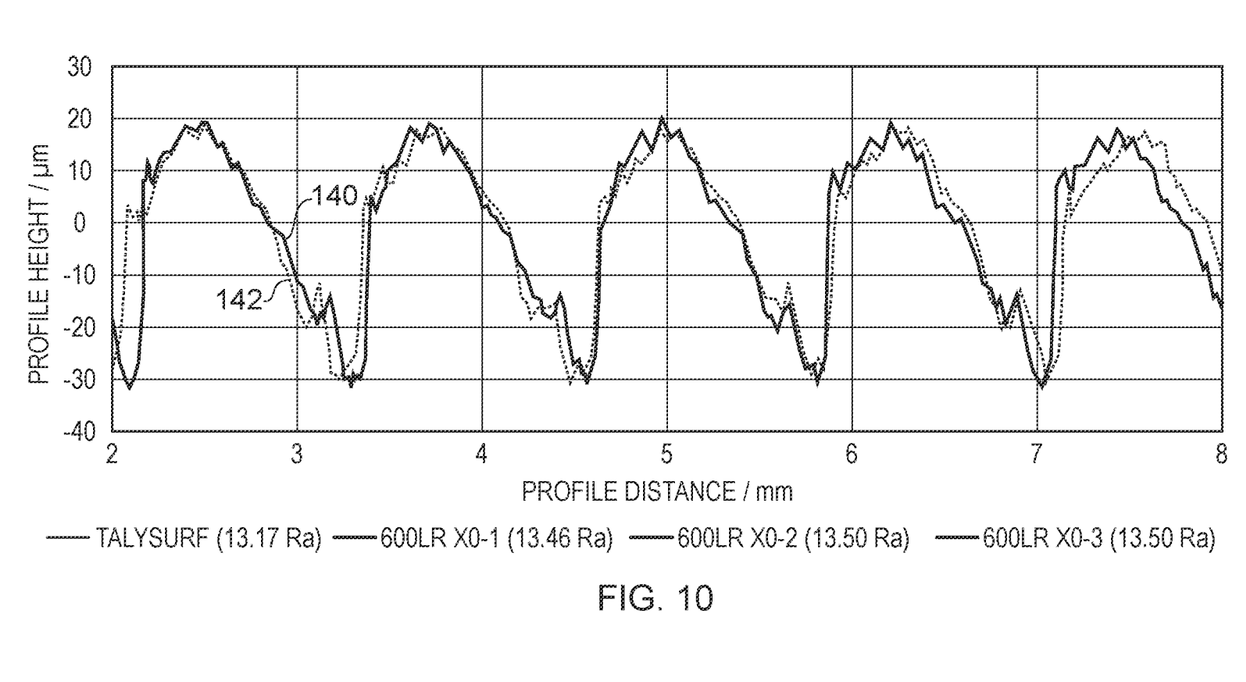
FIG. 10 shows surface roughness measured using a machine tool scanning probe comprising the stylus of FIG. 5b compared with a reference measurement.

FIG. 10 shows the experimental results generated when using the surface finish stylus illustrated in FIG. 5b to measure a vertically milled Rubert samples. In particular the overlapping solid lines 140 in FIG. 10 show three measurements taken along the same path on the surface of the Rubert sample. These experimental results were generated with a sample spacing of 1.67 μm, a feed of 100 mm/min and a sampling rate of 1000 points per second. It can also be seen from FIG. 10 that the three profiles taken in the same location give consistent values of 13.46, 13.5 and 13.5 Ra. The profiles thus have good agreement with each other with only some minor differences visible. The dashed line 142 shows the surface roughness of the same sample measured using a profilometer with a much smaller stylus radius. Although this gives a lower value of 13.17 Ra with a very similar profile, it should be noted that the Talysurf profile was not taken in the same location as the experimental results and is likely the cause of the difference. It can thus be seen that reliable surface finish measurements can be taken using the surface finish stylus illustrated in FIG. 5b.

Figure 11:
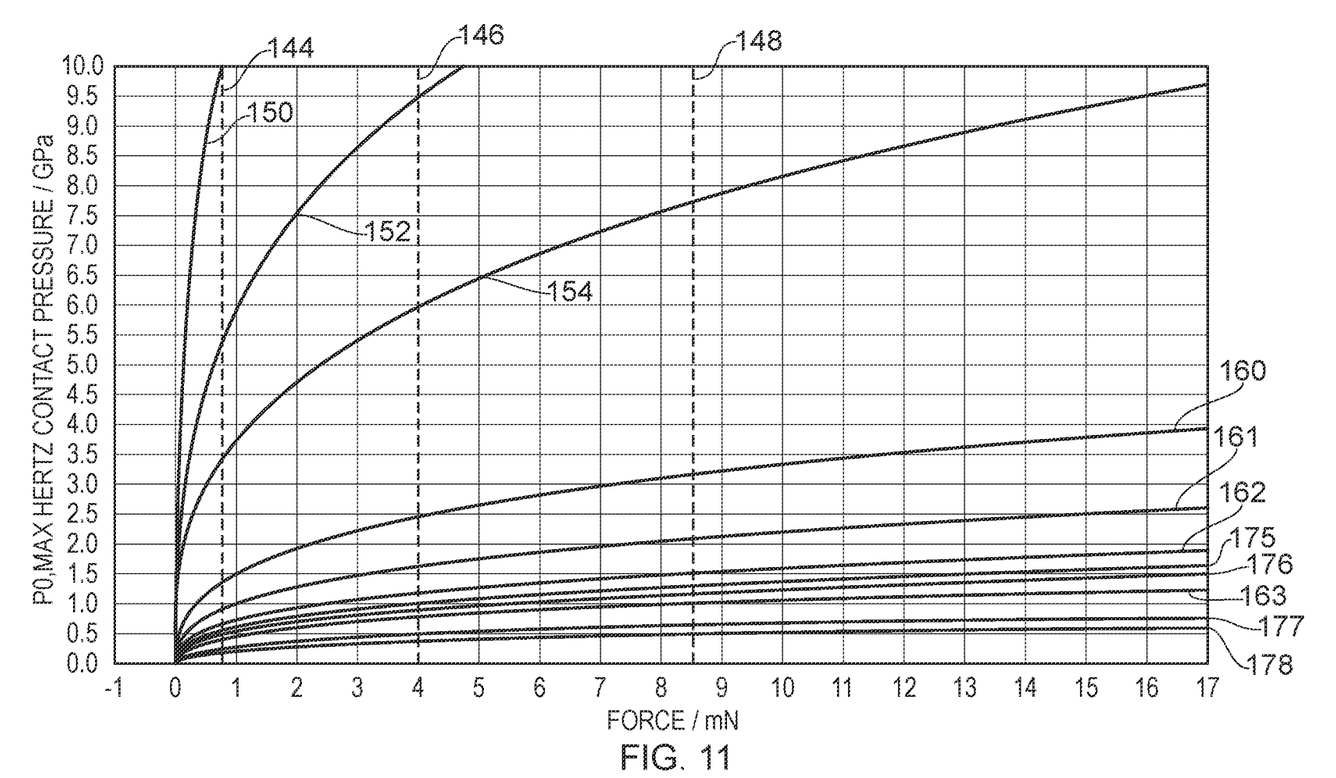
FIG. 11 shows the contact pressure as a function of applied force for a variety of stylus materials and geometries.

Referring to FIG. 11, the contact pressure applied to a sample as a function of applied stylus force is illustrated. Examples of standard stylus forces applied by a dedicated profilometers are shown as dashed lines 144 and 146, whilst the force applied by an existing machine tool probe is illustrated as dashed line 148. The curves 150, 152 and 154 show the contact pressures for the conically tipped styli of a standard profilometer having radii of 2 μm, 5 μm and 10

μm respectively. The Young's Modulus (E) of such conically tipped styli is assumed to be 614 GPa. Curves 160, 161, 162 and 163 show the contact pressures for steel disks (210 GPa) of effective radius 2 μm, 5 μm, 10 μm and 25 μm respectively. Curves 175, 176, 177 and 178 show the contact pressures for 25 μm effective radius disks of WC (614 GPa), ruby (435 GPa), Macor (67 GPa) and nitinol (45 GPa) respectively. It can thus be seen that materials with a lower E impart less contact pressure when engaged with a surface with a certain force. Selection of such materials can thus also reduce contact pressure for a given application force The skilled person would recognise that the above are merely examples of the invention. Alternative stylus structures could also be provided in accordance with the present invention.

The invention claimed is:

1. A surface finish stylus, comprising;
an elongate stylus shaft, and
a contact element protruding from the elongate shaft for contacting a surface to be measured, the contact element being located at an end of the elongate shaft where the surface is to be measured,
wherein the contact element is deformable and the stylus shaft comprises a clamp for retaining the contact element, the contact element being deformed by the clamp.

2. A surface finish stylus according to claim 1, wherein the contact element has an effective radius of less than 100 μm.

3. A surface finish stylus according to claim 1, wherein the contact element comprises a sheet of material having a thickness less than 1 mm.

4. A surface finish stylus according to claim 1, wherein the contact element is formed from a material having a Youngs' Modulus less than 150 GPa.

5. A surface finish stylus according to claim 1, wherein the contact element comprises metal.

6. A surface finish stylus according to claim 1, wherein the contact element comprises at least one of chromium steel and nitinol.

7. A surface finish stylus according to claim 1, wherein the contact element comprises one or more regions of weakness to cause a required deformation when retained by the clamp.

8. A surface finish stylus according to claim 1, wherein the clamp deforms a portion of the contact element to immovably secure the contact element to the clamp.

9. A surface finish stylus according to claim 1, wherein the clamp includes a pair of opposed clamping faces shaped to deform the contact element into the desired shape.

10. A surface finish stylus according to claim 1, wherein the clamp allows contact element to be releasably attached to shaft.

11. A machine tool scanning probe comprising; a probe body, a stylus holder moveably attached to the probe body, and a deflection sensor for measuring deflection of the stylus holder relative to the probe body, wherein a surface finish stylus according to claim 1 is attached to the stylus holder.

12. A surface finish stylus according to claim 1, wherein the contact element comprises a disk.

13. A surface finish stylus according to claim 12, wherein the clamp deforms the disk to form a hollow cone having a peripheral edge for contacting a surface.

14. A method for forming a surface finish stylus that comprises an elongate stylus shaft and a contact element protruding from the elongate shaft for contacting a surface to be measured, the contact element being located at an end of the elongate shaft where the surface is to be measured, the method being characterised by a step of clamping the contact element to the elongate shaft, the clamping step deforming the contact element.

* * * * *